Feb. 1, 1955  G. J. STREZYNSKI  2,701,204
PROCESS FOR MAKING CHEESE FROM MILK OF LOW FAT CONTENT
Filed Dec. 1, 1951  3 Sheets-Sheet 1

FIG. 1.

INVENTOR.
George J. Strezynski
BY
ATTORNEYS

Feb. 1, 1955  G. J. STREZYNSKI  2,701,204
PROCESS FOR MAKING CHEESE FROM MILK OF LOW FAT CONTENT
Filed Dec. 1, 1951  3 Sheets-Sheet 2

VALUES OF COMPRESSIBILITY & ACIDITY WITH VARIOUS TEMPERATURE CHANGES

INVENTOR.
George J. Strezynski
BY Davis, Hoxie & Faithfull
ATTORNEYS

Feb. 1, 1955   G. J. STREZYNSKI   2,701,204
PROCESS FOR MAKING CHEESE FROM MILK OF LOW FAT CONTENT
Filed Dec. 1, 1951   3 Sheets-Sheet 3

INVENTOR.
George J. Strezynski
BY Davis, Hoxie, Faithfull
ATTORNEYS

United States Patent Office 2,701,204
Patented Feb. 1, 1955

2,701,204

PROCESS FOR MAKING CHEESE FROM MILK OF LOW FAT CONTENT

George J. Strezynski, Poughkeepsie, N. Y., assignor, by mesne assignments, to Faster Food Products Company, New York, N. Y., a partnership Application December 1, 1951, Serial No. 259,360

36 Claims. (Cl. 99—116)

This invention relates to the production of cheese from skim-milk or milk of low fat content. It has for its principal object the provision of an improved process for such production, in which base curds of good texture, having a sufficiently low moisture content for direct consumption, are obtained by a continuous and rapid extraction of whey from the curds.

Milk of low fat content (that is, having up to 2% of butter fat) is used for the production of several types of cheese. One of the most popular of these so-called skim-milk cheeses is bakers' cheese, which is used not only for direct consumption, sometimes enriched with cream as an additive, but also in large quantities for making cheese cakes and other products. However, bakers' cheese and other types of skim-milk cheese, as made heretofore, have required a lengthy processing procedure utilizing bags for draining the whey from the curds, or requiring cutting of the mix after setting thereof and draining of moisture from the cutting tank.

According to conventional and long-used practices in the manufacture of skim-milk cheeses, the skim-milk is treated with additives to make a coagulable "mix," which is set at a low temperature for a period of about 18–30 hours. At the end of the setting period, the mix is fully coagulated and the curds may settle to the bottom or float toward the surface, depending upon the amount of gassing or aeration of the curds. The coagulated mix is manually stirred and then placed in bags and drained and pressed over a period of about 24–48 hours, surrounded by blocks of ice or in a cooler, at the end of which time the curds should be in the form of a heavy paste having a total milk solids concentration on a dry basis (by weight) in the order of 18–26%. The main objections to this conventional procedure are the prolonged time required for setting of the mix and the bagging or pressing operation, the labor and material expense involved in the operations, the various handling operations which are apt to result in contamination of the cheese, and the loss of cheese adhering to the bags or lost through breaking of the bags during handling. The long processing period entails a substantial inventory "in process" and requires a substantial plant storage area for the curds while they are being processed.

In another conventional process for making another type of skim-milk cheese, the bagging operation is not used but the cheese mix is set in an open vat or tank and treated with sufficient additives to complete the set in about 6–8 hours, after which it is cut up manually by rakes and the moisture drained from the tank, leaving only the cheese. Here again, the time required for processing is considerable, and the same objections apply with respect to labor and material costs, the risk of contamination, possible losses of cheese and poor keeping qualities.

The present conventional method of preparing cheese mixes is a gradual development of years of practice with the object of controlling the final titratable acidity of the cheese and enabling the whey to drain from the bags or tanks so as to produce a cheese having the desired percentage of total solids, for example, 25%. The procedure must also assure that the cheese will not be too granular and will have a pleasant flavor. Accordingly, the treatment must be carefully controlled. Such control is effected by means of the additives to the skim-milk in the mix, which allow a long period of setting and cause a very gradual change in the material, so that it can stand in bags or otherwise for a day or two without adversely affecting the product. Among these additives are the so-called "starters," which are curdled milk precipitated by means of strictly controlled bacteria. Another additive is rennet, which is an extract from calves' stomachs. A third additive, occasionally used, is calcium chloride. The additives contribute to precipitating the milk in the desired length of time, eliminating erratic behavior of the set, protecting against self-inoculation of the milk from impurities in the dairy, imparting the desired formation to the cheese particles, etc.

The setting of the mix is usually effected at a low temperature in order to prolong the time of setting and thereby prevent a granular consistency of the cheese. Heating of the mix accelerates the precipitation but causes granulation. For example, when the cheese mix is set at 110° F., it generally coagulates within a few hours but forms such a hard curd in the setting tank that the cheese lumps require the use of an instrument to cut them.

The period of setting is also affected by calcium chloride, the absence of which prolongs the setting period. The calcium chloride additive also replaces the natural calcium chloride in the milk, which is either precipitated or made less active by rennet or pasteurization, and it aids in digestion of the milk and formation of the curd. The function of the starter is to accelerate the formation of lactic acid by the bacterial action. It is added to the skim-milk in varying proportions, depending upon the type of cheese to be made. (For bakers' cheese it usually varies from 2 to 5%.) The rennet furnishes pepsins and enzymes of controlled quantity to replace those present in raw skim-milk but which are destroyed by pasteurization. In some cases, no rennet is added to the milk and the action is obtained from the starter and additional heat. The best example of this is the so-called "pot-cheese." Rennet is a very powerful reagent. As little as one part of rennet in 8000 parts of skim-milk will cause coagulation. The normal practice in making bakers' cheese is to add between 1 cc. of rennet per 80 lbs. of milk and 1 cc. per 1000 lbs. of milk. Generally, when less rennet is used it is necessary to use more starter. If less rennet is used in making the set, a higher heat may be used before the separation without causing excessive granulation.

Attempts have been made heretofore to use a centrifugal separator in the production of skim-milk cheeses, in place of the bagging or other draining operation. However, the cheeses resulting from these attempts have been far from satisfactory, because the curds discharged from the centrifuge have been either too thin and watery or too granular, or both; and only a small part of the separating capacity of the centrifuge could be used due to the difficulty in discharging the curds. For example, when curds prepared in a conventional manner for bagging were centrifuged in a standard De Laval "AC–VO" separator, the capacity of the separator was less than one-third of expected capacity and the cheese discharge through the peripheral nozzles of the centrifugal bowl had only 13–15% of total solids (by weight), whereas a minimum of 20% is generally required by legal restrictions covering the production and sale of such products. This condition persisted even when the feeding of the curds to the centrifuge was very carefully controlled. At the low capacity of the centrifuge, it was impossible to reduce the discharge rate of the cheese sufficiently to provide a cheese having in excess of 15% total solids, because the bowl nozzle holes for the discharge of the cheese must be large enough to prevent the cheese from plugging these holes. When the bowl was equipped with nozzles having the smallest practicable holes for an uninterrupted discharge of the cheese, more than two-thirds of the feed to the centrifuge was discharged through the nozzles and only one-third through the effluent spout. Consequently, the cheese had to be very thin. Even when part of the discharged cheese was recirculated to the bowl nozzles, so as to increase the rate at which the solids enter the bowl without increasing the actual feed rate to the bowl, the cheese had only 16–18% total solids.

In my copending application Serial No. 247,125 filed September 18, 1951, I have disclosed a process for making skim-milk cheeses, wherein precipitation of the curds is followed by a heat treatment of the curds and whey at a temperature of 80°–100° F. (preferably about 90° F.), after which the mixture is fed at this temperature to a centrifugal separator to separate whey from the curds. Such a process, by reason of the prescribed heat treatment, represents a distinct improvement in the art in that a substantially smooth-textured skim-milk cheese can be obtained from the centrifuge, with a solids content of at least 20%. However, I have found that the characteristics of the cheese produced by such a process are not always consistent, particularly with respect to the concentration and texture of the solids. The percentage of solids in the cheese discharged from the centrifuge will occasionally vary from the desired value, or the texture will change, and it is frequently impossible to control the process closely enough to counteract these variations. Moreover, the capacity of the centrifuge to handle the cheese is not high.

I have discovered that the controlling factor which determines the dryness of the skim milk cheese discharged from the centrifuge is the compressibility of the curds at the time of centrifuging. By "compressibility" is meant the extent to which the solids can be compacted under a given force, leaving free liquid or whey. Thus, if the curds are centrifuged for forty seconds in a standard De Laval 10 cc. glass test tube centrifuge (operating at 17,000 R. P. M.), the extent to which the solids are compacted at the closed or outer end of the tube is here regarded as the standard of measure of their compressibility. If, under the action of this centrifuging, the solids are compacted to a volume which is 30% of the total volume of the mix placed in the tube (the remaining 70% being free whey), the curds are considered as having a 30% compressibility factor. The lower this percentage, the higher the compressibility of the curds. I have found that the compressibility of curds prepared from skim-milk according to conventional practices varies considerably at different stages of the setting and also somewhat as between different cheese mixes. I have also found that the optimum condition for centrifugally separating the curds, with regard to obtaining curds as dry as possible from the centrifuge, is when the curds are most compressible, that is, when their compressibility factor expressed in the above percentage is lowest. Further, I have discovered that there is a close relation between the compressibility of the curds and their pH value and titratable acidity.

The behavior of a typical "long time" cheese set made according to conventional procedures is as follows: It starts with a pH value of 6.5–7.0 and an acidity (titratable) of about .1–.2%. It stays quite uniform at these values for several hours, and then a rapid drop takes place in the pH value and a rapid increase in the acidity. After about 16–17 hours of setting, the pH drops to about 5.0 and the titratable acidity becomes about .42%. The pH then levels off at about 4.75 for a period of several hours, whereas the titratable acidity continues rising. At the point where the pH has decreased to about 5.0, and before the titratable acidity has risen substantially thereafter, the compressibility of the curds, as measured in a glass test tube centrifuge, is definitely best and is about 21%. As the titratable acidity increases from this point, the compressibility of the curds becomes poorer. The titratable acidity builds itself to about .82%–.9% after the maximum compressibility is attained, and as this occurs, the compressibility of the curds decreases so that the above percentage factor, representing resistance to compression, increases from 21% to about 32%. When the compressibility of the curds is as poor as this, or even somewhat better, it is physically impossible to discharge the curds from the centrifuge at the desired dryness (for example, 25% solids on a dry basis).

On the other hand, if the mix of the above example is centrifuged when the compressibility of the curds is approximately maximum (when the pH has decreased to about 5.0 and the titratable acidity has risen to about .42%), the cheese discharged from the centrifuge, although of maximum dryness, has a different structure than the desired cheese. It is sandy and somewhat gummy and tough, the chemical reactions apparently having not been completed at the time of the centrifugal separation of the curds from the whey.

A further difficulty resides in the fact that the amount of the cheese mix in the smallest practicable commercial set is such that a period of one to two hours at least is required for the centrifuging, even in a centrifuge of high capacity. During this period, a substantial increase in the titratable acidity, such as that previously described, will be accompanied by such a decrease in the compressibility of the curds that the curds separated in the later part of the centrifuging run will not have the desired dryness. In other words, the time during which the curds are at about maximum compressibility, after having reached a sufficiently high titratable acidity (and sufficiently low pH value) to complete the chemical reactions and form curds of the desired consistency, is not long enough to enable centrifugal separation of the set. In addition, it is difficult to determine for each set the precise time when its pH and titratable acidity are at the optimum values for maximum compressibility of the curds, consistent with completion of the chemical reactions.

I have found that by holding the compressibility of the curds at about its maximum after the titratable acidity of the cheese set has reached a value of at least about .68%, at a pH of about 4.8 or less, the set can be centrifuged to provide consistently a relatively dry cheese of good texture. According to the invention, the normal loss of compressibility of the curds after this point of titratable acidity is reached can be arrested by the use of a low acid starter culture which produces a maximum titratable acidity of about .68% to .8% at a pH of about 4.5 to 4.8, or can be largely recovered by heating the set to a temperature of at least about 100° F., or both these expedients can be used. Preferably, the titratable acidity of the cheese set is caused to level off at a value of .68% to .8% at a pH of 4.6 to 4.8, at which time the set is centrifuged to separate curds from whey. However, the titratable acidity can be brought to a value somewhat higher than .8% if the set is then immediately heated to a temperature of at least 100° F. and held at the elevated temperature until the centrifuging is completed. In other words, if at the time of centrifuging the mix the titratable acidity thereof is substantially less than .68%, or the pH substantially greater than 4.8, the curds discharged from the centrifuge will have an undesirable gummy texture due to incomplete chemical reaction; and when the mix is centrifuged at a titratable acidity substantially greater than .8%, or at a pH substantially less than 4.6, the discharged curds will not have the desired dryness because of their poor compressibility when centrifuged, unless the mix is subjected to the aforesaid heating prior to the centrifuging.

Thus, one feature of the invention resides in holding down the titratable acidity of the mix after it has reached an acidity of at least .68% (with pH at 4.8 or less) and at a time when the curds are at substantially maximum compressibility, this restraining of the acidity being effected for a period (e. g. about two hours) sufficient to pass the mix through the centrifuge.

In the preferred practice of the invention, the aforementioned low acid culture is used in the mix in relatively large quantity as a starter, usually about 10–20% of the volume of the milk used in the mix, and a small amount of calcium chloride (for example, 1.5 oz. per 1000 lbs. of milk) is added. This not only holds down the titratable acidity after the pH has decreased to the prescribed value of 4.8 or less during the setting, thereby preventing any appreciable decrease in the compressibility of the curds, but also greatly shortens the time required for setting. For example, the setting time may be reduced to about 5 hours for bakers' cheese. The amount of rennet (if any) used in the mix is preferably kept at a minimum (for example, .1 oz. per 1000 lbs. of milk). Generally, when less starter is used, it is desirable to use more rennet. By means of the short-time set, the acidity of the mix and the compressibility of the curds are more readily and accurately controllable, so that approximately optimum compressibility is obtained and maintained after completion of the chemical reactions. In this way, too, the need for frequent determinations of the pH and acidity of the mix during the setting is greatly reduced or eliminated. Moreover, the short setting period evidently results in a better maximum compressibility of the curds after completion of the chemical reactions, probably because there is less gassing or aeration of the curds during the shorter period.

The temperature at which the mix is set, for best results, is important. I prefer to use a setting temperature between 86° and 92° F., as this range allows a short-time set while providing curds with a good texture. Generally, lower setting temperatures will require more starter culture or a longer setting time, or both; and higher setting temperatures will tend to make the curds too hard. Setting temperatures of less than 80° F. will generally make the controls more difficult and should be avoided if possible. Temperatures higher than 92° F. may be used to advantage over short periods to counteract excessive lactic acidity and decrease in compressibility, as may occur when the set gets out of control due to mistakes or carelessness of operators, or to a faulty starter. Thus, when the set is heated to about 100° F. prior to the centrifuging, the compressibility of the curds will increase (improve). For best results, the temperature at which the mix is centrifuged should not be less than 80° F. and is preferably about 100° F. Temperatures substantially higher than about 100° F. usually tend to give a granular consistency to the curds, although this effect is minimized when the higher temperature is held for only a short period.

The compressibility of the curds during the centrifuging is, as previously mentioned, critical with respect to the dryness of the curds discharged from the centrifuge. If the compressibility factor previously mentioned is as high as 18%, the discharged curds will not be sufficiently dry for bakers' cheese. Preferably, the mix is centrifuged while the curds have a compressibility factor of about 16% or less, although this value may be higher when the discharged curds do not have to be as dry as bakers' cheese, for example. A compressibility factor of about 15% or less during the centrifuging is optimum for most skim-milk cheeses. By centrifuging the set while the compressibility factor is at this value, and while the set is at about 100° F. and has approximately 4.7 pH and .7% acidity, it is possible to discharge from the centrifuge a finished bakers' cheese of good texture having as high as 25% dry solids.

The invention will now be further described in conjunction with the accompanying drawings, in which.

Figure 1:
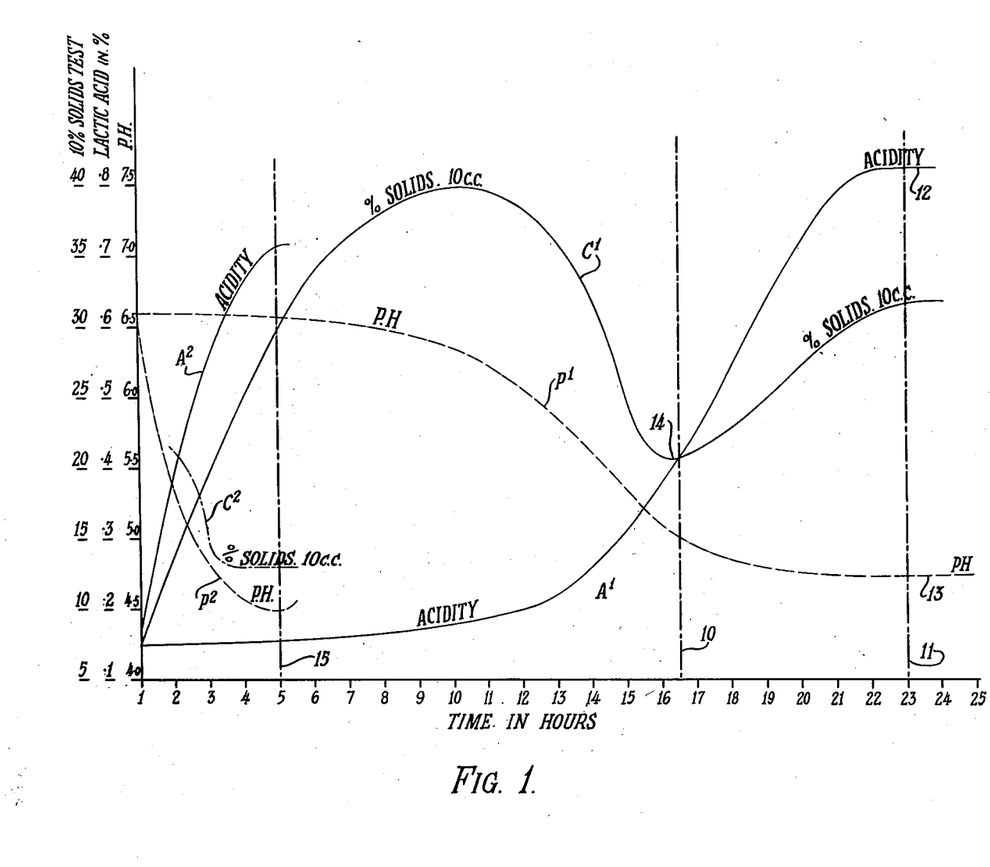
Fig. 1 is a graph of curves showing the behavior of a long-time set and also a short-time set, with respect to pH value, titratable acidity and compressibility of the curds, and showing an optimum condition for centrifuging the short-time mix according to the invention.

Referring to Fig. 1, the curves $A^1$, $P^1$ and $C^1$ represent, respectively, the percentage titratable acidity, pH value and the previously mentioned percentage factor of the compressibility of the curds of a conventional long-time set during the setting period; and the curves $A^2$, $P^2$ and $C^2$ represent the corresponding values for a short-time set. The values of the percentage compressibility factor for the curves $C^1$ and $C^2$ were determined by test-tube centrifuging as previously described. The compressibility curve $C^1$ shows that in the long-time set the maximum compressibility of the curds, after the acidity has risen substantially is reached in about 16 hours and remains approximately maximum (lowest percentage value) for about one hour. Thus, the optimum time for centrifuging the mix, to obtain curds of maximum dryness, is indicated generally by the line 10. However, at this point the titratable acidity ($A^1$) is only .42% and the pH value ($P^1$) is 5.0, so that the curds discharged from the centrifuge are gummy. On the other hand, if the centrifuging is deferred until the acidity reaches about .68% and the pH decreases to about 4.8, so that the chemical reactions can proceed sufficiently to provide curds of good texture, the compressibility of the curds becomes much poorer. That is, the aforementioned compressibility factor rises from about 21% to about 26%, so that the curds discharged from the centrifuge would have too much moisture for most purposes. At the point 11, where the acidity and pH have levelled off at about .82% and 4.75, respectively, the compressibility of the curds levels off to a value in excess of 30%, which results in the centrifugally separated curds being too watery.

In accordance with the present invention, the pH and the acidity of the set are controlled so that the curves $P^1$ and $C^1$ substantially level off when the compressibility of the curds is about at its best (minimum percentage value on curve $C^1$), at values of 4.8 or less and .68% or greater, respectively. In other words, the low point 10 of the compressibility curve is in effect displaced to the right relative to the curves $P^1$ and $A^1$, so that the titratable acidity, pH and compressibility tend to level off at about the time when the lowest point of the compressibility curve is reached after the acidity has risen to at least .68%. This effect can be obtained by heat treatment of the mix, as will be described in detail presently, but is preferably obtained by means of the additive introduced into the low fat-content milk in preparing the mix or set. For example, the setting of the mix at a given temperature can be accelerated by the use of calcium chloride or rennet, or by increasing the amount of starter culture, or by a combination of these expedients, whereby the level portions 12 and 13 of the curves $A^1$ and $P^1$, respectively, will occur sooner in relation to the optimum compressibility 14 on the curve $C^1$. By the use of a less active or lower acid starter culture (that is, a culture which develops a lower maximum acidity in the mix), the level portion 12 of the acidity curve $A^1$ can be made lower, which, in turn, depresses the corresponding portion of curve $C^1$; and so in this way too the prescribed relation of the curves can be obtained.

In the preferred practice, this relation of the curves is obtained by using in the mix a relatively large quantity of low acid starter culture, as illustrated by the curves $A^2$, $P^2$ and $C^2$ in Fig. 1. For example, a starter culture producing a maximum acidity of about .72% at a pH of about 4.5, under the temperature conditions of the set (about 90° F.), may be used in an amount of 10–20% of the volume of milk, together with 1.5 oz. of calcium chloride and .1 oz. of rennet per 1000 lbs. of milk. As shown in Fig. 1, the titratable acidity levels off at a value of about .72% and the pH levels off at about 4.5 after a setting period of five hours, by which time the compressibility of the curds has levelled off at about 13%. Thus, by starting the centrifugal separation of the batch at the point 15, the separation can be completed while the compressibility of the curds is at or near maximum and after the chemical reactions have progressed to the necessary extent. Accordingly, the curds discharged from the separator will have a good texture and will be of approximately maximum solids content (usually well over 18%). It will be noted that the centrifuging could be started after about four hours of setting and still produce curds of desired texture and dryness, because at this point the acidity has reached about .68% at pH of about 4.6, and the compressibility is about at its maximum of 13%. However, the levelling of the values at the point 15 enables the centrifuging to be carried out thereafter under the prescribed conditions as to acidity, pH and compressibility, and by prolonging the setting to a period of about five hours, the texture of the curds is improved.

Figure 2:
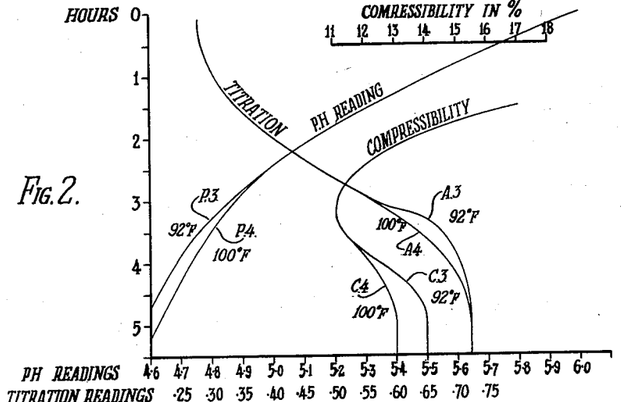
Figs. 2 and 3 are graphs of curves showing changes in the pH value, titratable acidity and compressibility of the curds of two different mixes made according to the invention, and illustrating the optimum conditions for the centrifuging and the effect of heating the mix prior to the centrifuging.

Referring now to Fig. 2, the curves there shown are illustrative of the behavior of a set prepared according to the invention as follows: The starting material was 30 cans of skim-milk having a pH of 6.05 and a titratable acidity of .15% at a temperature of 76° F. To this a low acid starter was added intermittently in a total amount of 5 cans and then 4 oz. of calcium chloride and 9 cc. of rennet were added, at which time the mix was at a temperature of 92° F. and had a pH of 5.95 and a titratable acidity of .28%. The mix was then set at this temperature for a period of about three hours, at which time it was divided and one part was heated to a temperature of 100° F. while the other part was held at the initial setting temperature of 92° F. The setting of these two parts at their respective temperatures was continued to provide a total setting period of about five hours, whereupon the centrifuging of the sets was commenced.

As shown in Fig. 2, at the end of this setting period the pH curve P³, acidity curve A³ and compressibility curve C³, for the set maintained at 92° F., levelled off at about 4.5–4.6, .72% and 14%, respectively. In the case of the set which was heated from 92° F. to 100° F., the pH curve P⁴ levelled off at a somewhat higher value (slightly less than 4.6) and the acidity curve A⁴ reached the same levelling point as the curve A³ but at a different rate. However, the compressibility curve C⁴ levelled at the lower percentage factor (higher compressibility) of 13%. In both cases, the compressibility was held near its optimum or maximum after the acidity had reached .68% and the pH had become 4.8 or less. Thus, in both cases, a relatively dry curd of good texture is produced by centrifuging the mix at the conclusion of the setting period of about five hours. In the case of the set which was heated to 100° F., the curds discharged from the centrifuging operation are somewhat drier than the curds discharged when centrifuging the other set.

Figure 3:
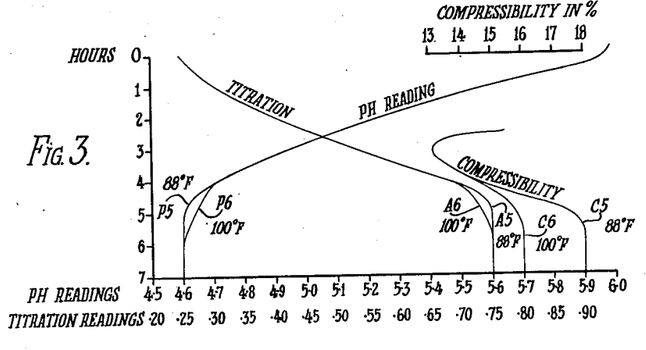

In Fig. 3, I have shown curves illustrating the behavior of a cheese set made in accordance with the invention and consisting of 40 cans of skim-milk, 5 cans of low acid starter, 5 oz. of calcium chloride, and 12 cc. of rennet. The additives were introduced gradually into the skim-milk, and at the start of the setting period the mix had a titratable acidity of .25% and a pH of 5.98. The mix was then set at a temperature of 88° F. for about four hours, at which time it was divided and one part was heated to 100° F. while the other part was held at the initial setting temperature of 88° F. The setting of these two parts at their respective temperatures was continued to provide a total setting period of about five hours, at which time the centrifuging operation was started.

As shown in Fig. 3, at the end of this setting period the pH curve P⁵, acidity curve A⁵ and compressibility curve C⁵ levelled off at about 4.6, .75% and 18%, respectively, in the case of the set which was maintained at 88° F. In the case of the set which was heated to 100° F., the pH curve P⁶ and acidity curve A⁶ reached the same levelling points as the curves P⁵ and A⁵, respectively, but at a slower rate. The compressibility curve C⁶ levelled at the lower percentage factor (higher compressibility) of 16%. Accordingly, in both cases the curds discharged from the centrifuging operation had a somewhat lower percentage of solids than the curds obtained in the examples illustrated in Fig. 2, due to the better compressibility of the curds in the Fig. 2 examples during the centrifugal separation of the curds. However, in both of the Fig. 3 examples the compressibility curves C⁵ and C⁶ were caused to level off near the optimum or maximum compressibility after the acidity had reached .68% and the pH had become 4.8 or less, so that the curds discharged from the centrifuge were relatively dry as compared with the curds which would have been discharged if the increase in titratable acidity (and hence the decrease in compressibility) had not been checked. If it had been desired to obtain drier curds in the Fig. 3 examples, this could have been accomplished by the use of a lower acid starter to cause the curves A⁵ and A⁶ to level off at an acidity nearer .68%. Also, by heating the set to 100° F. at an earlier stage of the setting operation, the curve C⁶ would have levelled off at a lower percentage factor so as to provide a better compressibility during the centrifuging, thereby increasing the solids content of the discharged curds.

It will be observed from Figs. 2 and 3 that the levelling of the compressibility curves near the optimum compressibility of the curds (minimum percentage factor), after the titratable acidity has reached about .68%, gives ample time for centrifugal separation of a large batch of the cheese mix. This enables large-scale production of curds which are uniformly relatively dry and of good texture.

Figure 4:
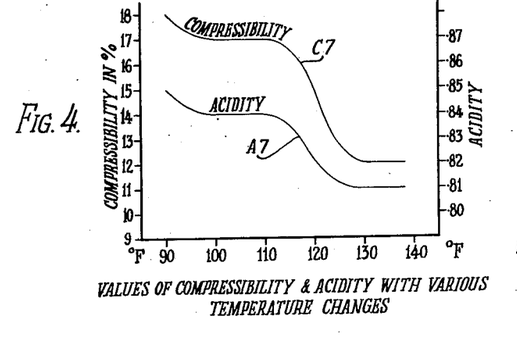
Fig. 4 is a graph of curves illustrating the effect of heating the mix above 100° F. at the conclusion of the setting and prior to centrifuging, with regard to titratable acidity and compressibility of the curds.

Referring now to Fig. 4, the curves there shown illustrate the effects of heat treatment of the set in stabilizing or reducing the titratable acidity and increasing the compressibility of the curds prior to centrifuging. These curves are based upon a mix similar to those previously described but which was allowed to set too long so that its acidity increased to about .87% and its pH dropped to about 4.5. The set was then divided into six batches which were heated, respectively, to 90° F., 100° F., 110° F., 120° F., 130° F., and 140° F. The curd compressibility and titratable acidity values of the separate batches were determined and plotted to form the compressibility and acidity curves C⁷ and A⁷, respectively. As shown in Fig. 4, the heating from 90° F. to 100° F. causes a fairly sharp drop in both the acidity and the compressibility factor, and then both these values remain constant from 100° F. to 110° F. Then there is another sharp drop in both values between 110° F. and 130° F., whereupon they level off again between 130° F. and 140° F. Thus, at the higher acidities, the heating of the set to about 100° F. not only arrests the normal increase in acidity and loss of compressibility but actually reverses the trend so that the acidity is reduced and the compressibility of the curds is improved; and by heating to the 110°–130° F. range, this effect is even greater.

According to the preferred practice of my invention, this heat treatment at either the lower or higher temperatures is used when the acidity cannot otherwise be held at about .8% or less for a sufficient time to enable the entire set to be centrifuged while the compressibility of the curds is near the optimum, or when the acidity has increased too much due to mistakes or carelessness of operators or to a faulty starter. For example, if the amount of the set is such as to require a prolonged period of centrifuging (e. g., 2–3 hours), heating the mix to about 100° F. prior to the centrifuging will generally suffice to maintain the desired conditions for the longer period. If the acidity has been allowed to go too high to be rectified by heating to 100° F., the higher temperature of 110°–130° F. is used in order to enable centrifugal separation of the set at an acidity of .8% or less and while the compressibility of the curds is near the optimum or maximum. For batches of usual commercial size, the best results are obtained by the use of a starter producing a low acid development of .7–.75% titratable acidity at a pH of about 4.7, and effecting a prolonged retarding of the acidity at this point by heating the set to about 100° F. prior to the centrifuging, so as to allow ample time for the centrifugal separation under the best conditions.

A further example of the new process is as follows: Skim-milk is brought to a temperature of 88° F. and is then treated with a low acid starter in an amount of 15% by volume of the milk. The mix is set for about one hour, at which time the titratable acidity is .2%, and is then treated with rennet and calcium chloride in amounts, respectively, of .1 oz. and 1.5 oz. per 1000 lbs. of milk. The mix is then kept at the temperature of 88° F. for about 3½–4 hours. After this initial period, the pH is about 4.75 and the acidity about .68%. The mix is then stirred, preferably in a closed vessel, for a period of about 15 minutes, at which time the pH is about 4.7 and the acidity about .72%. While the set is being mixed, the temperature in the setting vat is raised to about 100° F. Upon completion of this mixing and heating, the set is centrifugally separated. If the heating to 100° F. is omitted, the moisture content of the curds discharged from the centrifuge is higher (about 78%) and while the cheese could be used as a cottage cheese, it would not be suitable at bakers' cheese, since the latter should have a moisture content no greater than about 74–75%.

Another example is a cheese mix consisting of 80 cans of skim-milk, 9 cans of low acid starter, 10 oz. of calcium chloride, and 23 c. c. of rennet, the mix being set at 88° F. for about 6 hours, at which time the pH is about 4.7 and the titratable acidity about .73%. The set is then centrifuged at about 100° F.

As another example, a cheese mix was made consisting of 39 cans of skim-milk, 6 cans of low acid starter, 4 oz. of calcium chloride and 9 cc. of rennet, and was set at 90° F. The data on the setting of the mix were as follows:

| Time (Hrs.) | pH | Titratable Acidity (Percent) | Compressibility Factor (Percent) |
|---|---|---|---|
| 2 | 5.55 | .36 | 23 |
| 3 | 5.32 | .45 | 15 |
| 4 | 5.05 | .57 | 10 |
| 5 | 4.82 | .65 | 9 |
| 6 | 4.65 | .68 | 10 |
| 7 | 4.62 | .74 | 10 |

The set was then mixed in the vat for a period of ten minutes, whereupon the centrifuging run was commenced with a standard De Laval AC–VO centrifuge having .050" caulk discs provided with 2 sets of distribution holes at radii of about 3 and 4¾ inches, respectively, from the bowl axis. The peripheral outlets of the bowl, for discharging the curds, consisted of four nozzles which will be described presently. The set was centrifuged at a temperature of about 87° F. When the set had been mixed and fed through a centrifugal pump leading to the centrifuge, the curds had a compressibility factor of about 16%. The centrifuging of the set was started about 7¼ hours after the beginning of the setting period and was completed in about thirty-five minutes. The whey was discharged from the centrifuge (De Laval AC–VO) at a rate of about 770 gal./hr. during the first half of the centrifuging run, and then at a lower rate of about 685 gal./hr. At the higher discharge rate, the whey contained about 2% solids (by volume) and at the lower rate it contained about .36% solids. The solids content of the curds discharged from the centrifuge varied between approximately 27% and 29% (by weight).

The new process can be used for making a great variety of skim-milk cheeses, such as bakers' cheese, base cheese for spreads, and cottage cheese. The nature and amount of the additive or additives to the skim-milk may be varied to provide the desired flavor and other characteristics of the final product, within the limits previously defined with respect to control of the titratable acidity and pH of the set to obtain relatively dry curds of good texture from the centrifuge. In the production of cottage cheese, for example, it may be desirable to add "Sea-Lac" and omit calcium chloride and rennet. In this case, the starter may be added in an amount of about 15% of the skim-milk, and a coagulant may also be added which is a calcium fortifier and which may be any one of the coagulants commonly used for cottage cheese precipitation.

The curd discharge from the centrifuge, in accordance with the present invention, constitutes essentially a finished base curd. It can be used as bakers' cheese, or it can be used as a base curd for making other cheese products. For example, cottage cheese may be obtained from the base curds by heating them to a temperature of about 145° F. after the centrifuging, which is preferably effected between 80° and 100° F., before cooling the curds. In the production of other types of cheese, the curds discharged from the centrifuge are preferably passed promptly through a cooler where they are cooled to the desired storing temperature, usually about 50° F. This increases the viscosity of the curds and causes the moisture therein to be held firmly between the curd particles, so that the cheese is not subject to "watering." Base curds produced by the new process are also well suited for blending with cream, to make cream cheese and other cheese products of relatively high fat content. The blending with cream is preferably effected incident to discharging the curds through the peripheral nozzles of the centrifugal bowl, by feeding the cream through flush tubes extending generally radially of the bowl into or to the regions of the nozzles. In this way, a mixing of the base curds and the butter fat takes place within the centrifugal bowl, thereby avoiding contamination of the final product.

Base curds made according to the invention have a unique characteristic as regards curds derived from milk of low fat content. That is, they are heat-stable. They can be heated to pasteurizing temperature without becoming soupy, tough or grainy, and require no water-binder or other special measure for this purpose. Thus, the base curds are admirably suited for blending with cream and for making a large variety of cheese products requiring heat treatment at temperatures in the order of pasteurizing temperatures. So far as I am aware, it has not been possible heretofore to produce a skim-milk or low fat content curd which is heat-stable in itself, requiring no special additives for this purpose. I attribute this characteristic of base curds of the new process to the uniformly small size of the agglomerations of the solid particles which make up the curd, practically all of these agglomerations being between 2 and 3μ, and to the moisture enclosing the clusters or agglomerations of the particles, as can be observed by microscopic inspection. There are no long particles, and each particle appears covered by adhering fine particles of moisture. On the other hand, samples of bagged cheese show irregular agglomerations, large and small, of the solid particles, and the same microscopic inspection reveals no sign of moisture around the agglomerations. Evidently, the pH, titratable acidity and temperature controls previously described, together with an homogenizing effect incident to discharging the curds from the centrifuge, combine to give the curds their heat stability.

Another advantage of the new process is that the yield of curds is considerably higher than with conventional processes. The amount of solids discharged from the centrifuge with the whey is substantially less than the amount of solids lost from the curds in conventional processes.

In the normal practice of the present invention, the effluent or whey discharged from the centrifugal separator will vary from day to day with respect to its clarity, that is, the amount of solids contained in it. These variations are due to the fact that successive batches of the cheese mix are seldom identical, and to unpredictable variables encountered in the centrifuging. The centrifugal separation of the curds from the whey will occasionally result in a whey which carries a small percentage of curds, sometimes about 1% by volume (.2% by weight). The whey also contains residual fat as well as proteins or albumins, which are very nourishing. Many attempts have been made to find a market for albumins precipitated from whey, but no profitable market has been found for them heretofore. According to another feature of the present invention, the albumins and curds in the centrifugally separated whey are recovered from the whey and then introduced into a subsequent batch of cheese mix, whereby they are at least partly incorporated into the cheese or curds discharged from the centrifuging of this subsequent mix. This further increases the yield of cheese. The recovery of the albumins is preferably effected by precipitating them in the whey in any conventional manner, usually at high temperature, and then centrifuging the whey to separate therefrom the precipitated albumins and residual curds. The precipitated albumins act to pull down the residual curds and also entrap the residual fat discharged with the whey in the primary separation of whey from curds, thus facilitating the recovery of the fat and curds along with the albumins.

As previously mentioned, a low acid starter culture is preferably used in relatively large quantity in preparing the cheese mix. While such starters are available commercially, I shall now describe by way of example a procedure for preparing a low acid starter culture from a standard commercial culture for fermented milk products:

*First propagation*

A 500 ml. Pyrex Erlenmeyer flask of selected milk is placed into a Dixie retort and held at 15 p. s. i. for 15 minutes. This steam pressure sterilizes the flask and milk at 230°–240° F. Non-absorbent cotton is used for stoppering the flask, the cotton plugs extending downward about 1½ inches into the neck and having a square of clean parchment tied over the top. Extreme care must be taken after removal of the flask from the retort, to guard against contamination. The flask of milk is then cooled to 80° F., and the commercial culture is added and thoroughly mixed with the milk. The flask is then placed in a culture cabinet and its content incubated overnight, until a soft curd is formed (from 9–12 hours). It is then refrigerated until the following evening when the second propagation is made.

*Second propagation*

A flask of milk is sterilized as previously described and cooled to 70° F. It is then inocculated with about 1% of the fresh culture, a sterilized pipette being used for this purpose. Then it is placed in the culture cabinet and incubated overnight at 70° F., until a soft curd is formed, after which it is refrigerated until the following evening when the third propagation is made.

*Third, fourth and succeeding propagations*

The third, fourth and succeeding propagations follow in the same manner as previously described, the amount of inocculation being regulated to give the desired development in 9–12 hours. The culture derived from the second propagation is usually suitable as a low acid starter for making the cheese mix, but the culture should be propagated every day or two in order to keep it healthy and active. The degree of ripeness or acidity depends upon the length of incubation.

Figure 5:
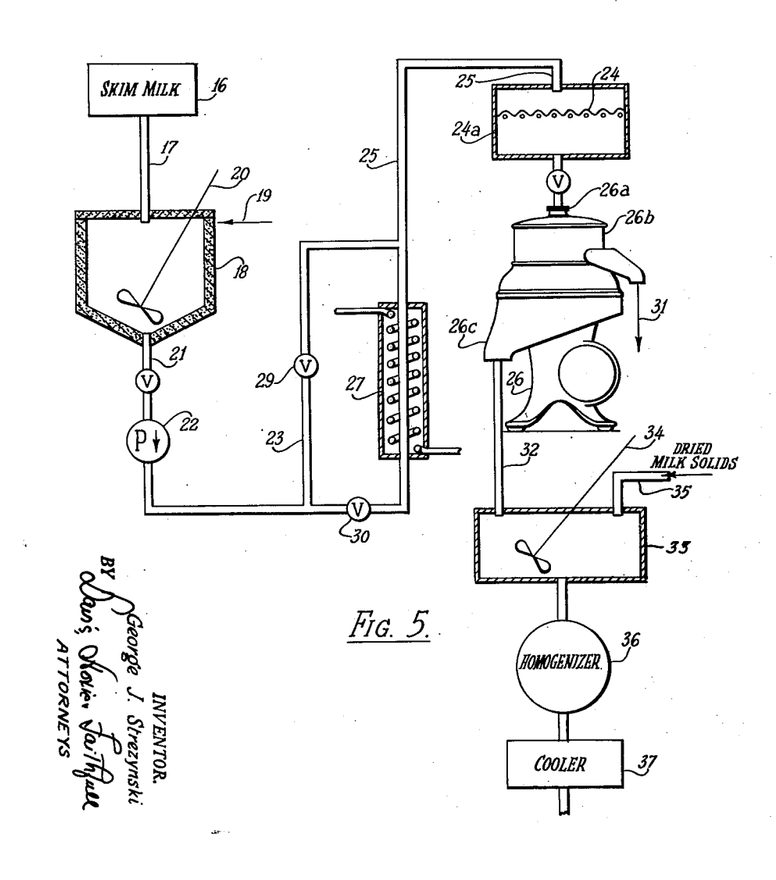
Fig. 5 is a diagrammatic view of a preferred installation for use in carrying out the new process.

Referring now to Fig. 5, I have there shown schematically (and partly in section) an installation for carrying out the new process. It comprises a closed tank 16 for receiving a supply of skim-milk obtained, for example, from a centrifugal separator (not shown) adapted to separate whole milk into its cream and skim-milk components. For most skim-milk cheeses, the skim-milk should have a fat content of not more than .1%. The skim-milk is passed through a pipe 17 to a holding or setting tank 18 which is likewise closed. This tank is jacketed and provided with a pipe line 19 for introducing a heating fluid into the jacket space. After the desired quantity of skim-milk has been accumulated in the tank 18, the skim-milk is inocculated with the curdling agent or starter culture, and any other additive to be included in the final product is introduced. The additives may be introduced through a small opening (not shown) in the tank 18. Mixing of the additives with the skim-milk may be effected by means of a mechanical stirrer 20. The cheese mix is then set in the tank 18, the mix being brought to and maintained at the setting temperature by the fluid fed to the jacket space through pipe 19.

The starter, as previously mentioned, preferably is a low acid culture and is added in an amount of 10–20% by volume of the milk. Good results are obtained by setting the mix in the tank 18 at a temperature of 88° F. for about 4 hours, and controlling the additives so that at this point the pH of the set is about 4.8 and its titratable acidity is about .7%, at which time the centrifuging operation is started. Usually, it is desirable to subject the set to mild agitation, as by means of the stirrer 29, just before the centrifuging is commenced. The purpose of this agitation is to obtain a uniform mixture of precipitated curds and whey within the tank 18, but the agitation should be mild in order to prevent aeration of the curds, which would tend to lower their specific gravity and make it more difficult to centrifugally separate them from the lighter whey.

The mixture of precipitated curds and whey is centrifuged by feeding it from the bottom of tank 18 through a pipe 21, positive pump 22, pipe 23 and strainer 24, into a feed tank 24a, from which it flows by gravity through pipe 25 to the centrifugal separator 26. The strainer 24 serves to prevent passage to the centrifuge of curds sufficiently large to clog the nozzles through which the curds are discharged from the centrifugal bowl. During its passage to the centrifuge 26, the mixture of curds and whey is preferably heated to about 100° F. or higher, by means of a suitable heater 27, which may be a jacketed pipe. As shown, the heater 27 is arranged to be by-passed by the pipe 23, so that by manipulation of valves 29 and 30 the mix may be passed through either the heater 27 or the pipe 23, or partly through both. In cases where the pH of the mix at the start of the centrifuging is substantially lower than 4.8 (e. g. 4.6 or less), its temperature is preferably raised above 100° F. by heater 27, in order to counteract the loss of compressibility of the curds which would otherwise occur. Also, in separating a large batch of the mix, it is desirable that the temperature to which the mix is heated when it passes to the centrifuge be gradually increased above 100° F., to counteract the increase in lactic acidity which would occur over the relatively long period required for centrifuging the entire batch. This can be accomplished by initially passing a substantial amount of the mix through pipe 23 and then gradually cutting down the flow through by-pass pipe 23 so as to increase the flow through heater 27, or by increasing the heat supply to heater 27 or to holding tank 18, or by a combination of these expedients.

The centrifuge 26 is of the type in which the rotating bowl has peripheral outlets in the form of nozzles for discharging centrifugally separated solids or relatively high specific gravity (curds), and has a central outlet for discharging a liquid of relatively low specific gravity (whey). I have found that good results are obtained with the use of a De Laval centrifuge of the standard AC–VO type. Since this centrifuge is well known in the centrifugal art, it is unnecessary to describe it in detail. It is disclosed generally in my Patent No. 2,500,101, dated March 7, 1950. The conical discs used in the AC–VO bowl may be provided with two sets of distribution holes, although good results are obtained when these holes are omitted. The discs may have a 50° angle with the vertical axis and a diameter of 300 mm., and .050 inch caulks may be used between the discs. In order to provide a uniform feed rate to the centrifuge which may be readily controlled, the feed tank 24a may be provided with a float valve for maintaining a predetermined liquid-level above the airtight connection 26a to the centrifuge.

The curds and whey are continuously separated in the bowl of centrifuge 26, the whey being discharged through the central outlet of the bowl into the stationary cover 26b having a spout leading to the whey discharge line 31. The separated curds are discharged through the peripheral nozzles of the bowl into a stationary cover 26c, the latter having a bottom spout through which the curds are delivered. It is recommended that four nozzles be used for discharging the curds, these nozzles being preferably of the type to be described presently, each nozzle providing a passage having a minimum diameter of about .7 mm.

It will be apparent from the foregoing that the new process enables substantially continuous production of cheese under conditions which will insure a sanitary product. By carrying out the process in a practically closed system, as described, the possibility of contaminating the final product with air-borne dirt is largely or entirely eliminated, since the material being processed has no substantial contact with free air. Also, manual handling of the material during the processing is eliminated, which is a distinct improvement over bagging and other conventional methods.

As previously described, the curds discharged from the centrifuge cover 26c will normally be of good texture and sufficiently dry for direct consumption, if the setting and centrifuging of the mix have been effected under the proper conditions prescribed herein. In some instances, however, it may be desirable to increase the solids content of the centrifugally separated curds or to make them still smoother in texture, or both. To this end, the curds may be discharged from the cover 26c through a pipe 32 into a closed receptacle 33 containing an agitator 34, the receptacle also having a feed line 35 through which dried milk solids are introduced into the curds for admixture therewith by the agitator. This allows operating the centrifuge at a higher throughput rate than that necessary to provide the desired solids content of the final curds, and then making up the deficiency in solids content after the separating operation. The curds may then be passed through an homogenizer or grinder 36 to obtain a still finer particle size and effect a more intimate mixing of the curds with the added milk solids. From the homogenizer 36, the curds may be passed through a continuous type of cooler 37, where they are cooled to about 50° F., and then fed directly into receptacles for shipment or storage.

Figure 6:
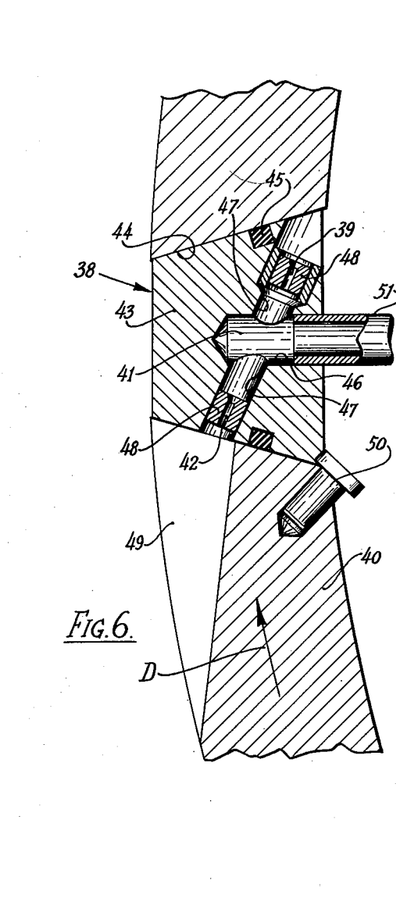
Fig. 6 is a horizontal sectional view of part of a centrifugal bowl, showing a special form of nozzle for discharging the separated curds.

The texture of the curds may be further improved by the use of special nozzles for discharging the curds from the bowl of the centrifuge 26. These nozzles, one of which is illustrated in Fig. 6, are characterized by a primary restricted passage 39 leading from the outer portion of the space in bowl 40 to an enlarged space 41 in the nozzle, and a secondary restricted passage 42 leading from this space to the outside of the bowl. Thus, in the discharge of the curds through the nozzle (indicated generally at 38), the pressure drops in two stages instead of in a single stage. As shown, each nozzle 38 comprises a frusto-conical body or insert 43 seated in a complementary hole 44 in the wall of bowl 40, where it forms a tight seal by means of a gasket 45. The space 41 is formed by the intersection of two bores 46 and 47, the former extending outward partly through the nozzle body 43 from the separating chamber or locus of centrifugal force in the bowl, and the bore 47 extending completely through the body at an angle to the first bore. The inner and outer portions of bore 47 are fitted with bushings 48 having the restricted flow passages 39 and 42, respectively. The nozzle discharge path 39—41—42 extends generally tangentially of the annular bowl wall 40, its direction (from its inner end to its outer end) being opposite to the direction of rotation of the bowl, as indicated by arrow D. Accordingly, the curds are discharged through nozzle 38 in a backwardly reacting jet, to enable a saving in power necessary to drive the bowl. The outer surface of the bowl wall has a recess 49 directly behind the outer, rear end of bore 47, so that it is unnecessary for any part of the nozzle to project beyond the contour of the bowl. The nozzle body 43 is held by centrifugal force against its seat 44 during rotation of the bowl. When the bowl is stationary, the nozzle body is held by a retaining pin 50 which, however, can be removed to allow withdrawal of the nozzle from the bowl.

When it is desired to add butter fat to the curds, it is advantageous to introduce cream separately into the spaces 41 of the nozzles by means of radial flush tubes 51 in the bowl. These flush tubes may be arranged as disclosed in my Patent No. 2,518,436, dated August 8, 1950, but each tube is fitted closely at its outer end in the bore 46 of the corresponding nozzle 38, as by means of a suitable gasket or collar (not shown). The cream is fed into the inner end of each tube 51 in any suitable manner (see, for example, my aforesaid Patent No. 2,518,436) and is delivered through the tube, separately from the other material in the bowl, directly into the nozzle space 41, where it joins the curds being discharged from the bowl. By reason of the reduced pressure in each nozzle space 41, the cream is mixed into and discharged with the curds, even though the cream is of lower specific gravity than the curds and the whey. If the fat were introduced into the bowl proper, it would be largely displaced inwardly and discharged with the whey, and this would be true to a considerable extent even if it were introduced into the bowl near the nozzle entrances. Moreover, by mixing the cream or fat with the curds in the nozzle spaces 41, the curd particles are coated with fat before they are exposed to air upon discharge from the centrifugal bowl, whereby oxidation and changes in flavor of the curds are reduced. When it is not desired to mix cream or other material with the discharging curds, each flush tube 51 may be replaced by a plug (not shown) closing the inner portion of bore 46.

The double-jet nozzles 38 perform an homogenizing or grinding action upon the discharging curds. The two-stage drop in pressure through each nozzle has the effect of reducing considerably the discharge rate through the escape path 39—41—42, as compared with the rate through a conventional continuous escape path of the same throughflow area as the passages 39 and 42. This effect is due primarily to a substantial loss of pressure head caused by impact, eddying and turbulence at the region where the relatively small jet from passage 39 enters the relatively large and slower moving mass in the sealed space 41, and another substantial loss of pressure head caused by a somewhat similar action at the region where the space 41 joins the passage 42. Thus, the power required to drive the bowl when using the double-jet nozzles 38 is substantially greater than when using conventional nozzles, even at a lower feed rate to the bowl; but the excess power consumption is mainly used in homogenizing the curds in the nozzles 18, which is a distinct advantage. Also, since the discharge rate through each nozzle 38 corresponds to that of a conventional nozzle having a considerably smaller passage (in diameter), the danger of the nozzle becoming clogged by the curds is reduced or eliminated.

In the foregoing, I have set forth several examples of the practice of my process with the use of a short-time set, which is preferred. The disadvantage of using a long-time set is apparent from the following example: A cheese mix was prepared consisting of 30 cans of skim-milk, 24 quarts of low acid starter, 1 oz. of CaCl and 7 cc. of rennet, and was set initially at 65° F., the setting temperature gradually increasing to 69° F. The optimum compressibility of curds for centrifuging, after their initial formation, was reached in about 18 hours. However, at this time the pH was 4.9 and the acidity was only .58%, which is too low to obtain curds of good texture by centrifuging. By the time the acidity had reached .7%, at which time the pH had dropped to 4.6, the compressibility factor of the curds had increased from its optimum of 22% to a value of 26%, at which the curds would be too watery when centrifugally separated. Heating the mix to 105° F., just before the centrifuging, reduced the compressibility factor to about 20%, but even with this heat treatment the curds discharged from the centrifuge were too low in concentration of solids and did not have the desired smooth texture. Heating the set to a still higher temperature (e. g. 140° F.) prior to the centrifuging would have further improved the compressibility of the curds and resulted in drier curds discharged from the centrifuge. Such heating, however, is not desirable as a regular procedure of the process.

It thus appears that by the use of a short-time set, as previously described, (a) the necessary minimum acidity (.68%) for good formation of the curds is obtained at about the time when the optimum compressibility of the curds for centrifuging is reached, or at least not substantially thereafter, and (b) this optimum compressibility is somewhat better (lower compressibility factor) than in the case of a long-time set. These desirable effects are apparently reduced when the setting conditions are varied to prolong the setting period, as by decreasing the setting temperature and the amount of starter. The use of the short-time set in the practice of my process is therefore much preferred, although the process may be practiced with the use of a long-time set, as described, for instance, in the preceding example, or the conditions may be controlled to provide a setting period of intermediate duration.

While I have described a separation of the curds from the whey by means of centrifuging, it is possible that other expedients, such as filtering, may be used for this purpose, provided that they enable the separation to be effected rapidly, as distinguished from the slow separation characteristic of bagging or draining.

I claim:

1. In the production of cheese from milk of low fat content by forming a cheese mix including the milk and a starter, and setting the mix to coagulate the curds and form an acid mixture of curds as a heavier component and whey as a lighter component, the starter acting to promote a decrease in the pH value and an increase in the titratable acidity of the mix during the setting thereof, the improvement which comprises subjecting the mix to a rapid separating operation after its pH value has decreased to about 4.8 and its titratable acidity has increased to about .68%, but while the compressibility of the curds is at substantially the maximum compressibility attained after said last pH value and titratable acidity have been reached, thereby separating curds from whey.

2. The improvement according to claim 1, in which the rapid separation is effected while the mix has a pH value of 4.5 to 4.8 and a titratable acidity of .68% to .8%.

3. The improvement according to claim 1, in which the rapid separation is effected while the mix has a pH value of about 4.7 and a titratable acidity of about .7%.

4. The improvement according to claim 1, in which the mix is set at a temperature of at least 80° F.

5. The improvement according to claim 1, in which the mix is set at a temperature of 86° to 92° F.

6. The improvement according to claim 1, in which the mix is set at a temperature of at least 80° F., and in which the temperature is increased during the setting period.

7. The improvement according to claim 1, in which the mix is set at a temperature of 86° to 92° F., and in which the mix is heated to a higher temperature for the separating operation.

8. The improvement according to claim 1, in which the rapid separation is effected while the mix is at a temperature of at least 80° F.

9. The improvement according to claim 1, in which the mix is set at a temperature of 86° to 92° F. and is separated at a temperature of about 100° F.

10. The improvement according to claim 1, comprising also the step of heat treating the separated curds at approximately pasteurizing temperature.

11. A process for producing cheese from milk of low fat content, which comprises making a cheese mix including the milk and a starter, the starter being a low acid culture adapted to develop a maximum titratable acidity in the range of .68 to .8% at a pH in the range of 4.5 to 4.8 under the conditions of the process, setting the mix until its titratable acidity and pH value are within said ranges, respectively, thereby forming an acid mixture of precipitated curds as a heavier component and whey as a lighter component, and then subjecting the mix promptly to a centrifuging operation to effect a rapid separation of curds and whey.

12. The process according to claim 11, in which the mix is set at a temperature of at least 80° F.

13. The process according to claim 11, in which the mix is set at a temperature of at least 80° F., the mix being heated to a higher temperature prior to the centrifuging operation.

14. The process according to claim 11, in which the starter is added in an amount of at least 10% by volume of the milk.

15. A process for producing cheese from milk of low fat content, which comprises making a cheese mix including the milk and a starter in an amount sufficient to develop in the mix a titratable acidity in the range of .68% to .8% at a pH in the range of 4.5 to 4.8 in not substantially more than five hours, setting the mix until its titratable acidity is at least .68% and its pH value is no greater than 4.8, to form an acid mixture of precipitated curds as a heavier component and whey as a lighter component, and centrifuging the mix to effect a rapid separation of curds from whey while the curds are at substantially the maximum compressibility reached after said acidity of .68% has been attained.

16. A process for producing cheese from milk of low fat content, which comprises making a cheese mix including the milk and a starter in an amount of 15 to 20% by volume of the milk, setting the mix until its titratable acidity is at least .68% and its pH value is no greater than 4.8, to form an acid mixture of precipitated curds as a heavier component and whey as a lighter component, and centrifuging the mix to effect a rapid separation of curds from whey while the curds are at substantially the maximum compressibility reached after said acidity of .68% has been attained.

17. In the production of cheese from milk of low fat content by forming a cheese mix including the milk and a starter, and setting the mix to coagulate the curds and form an acid mixture of curds as a heavier component and whey as a lighter component, the starter acting to promote a decrease in the pH value and an increase in the titratable acidity of the mix during the setting thereof, the improvement which comprises holding down the titratable acidity of the mix, during the setting thereof, to a range of about .68 to .8% when the pH thereof reaches a range of about 4.5 to 4.8, and centrifuging the mix while the titratable acidity and pH are within said ranges, respectively, to effect a rapid separation of curds from whey.

18. The improvement according to claim 17, in which said titratable acidity is held down by the use of a low acid culture as said starter.

19. The improvement according to claim 17, in which said titratable acidity is held down by heating the mix.

20. The improvement according to claim 17, in which said titratable acidity is held down by the use, as said starter, of a low acid culture in an amount of at least 10% by volume of the milk, and setting the mix at a temperature of 86° to 92° F.

21. The improvement according to claim 17, in which said titratable acidity is held down by the use, as said starter, of a low acid culture in an amount of at least 10% by volume of the milk, and setting the mix at a temperature of 86° to 92° F., the mix being heated to a higher temperature prior to the centrifuging thereof.

22. A process for producing cheese from milk of low fat content, which comprises making a cheese mix including the milk, a starter in an amount of at least 10% by volume of the milk, and calcium chloride, setting the mix for a period not substantially more than 5 hours, at a temperature in excess of 80° F., thereby forming an acid mixture of curds as a heavier component and whey as a lighter component, and centrifuging the mix after its titratable acidity has reached .68% and its pH value has decreased to 4.8, but while the curds are at approximately the maximum compressibility attained after said titratable acidity of .68% has been reached.

23. The process according to claim 22, in which said mix also includes rennet.

24. The process according to claim 22, in which the mix includes a low acid starter culture in an amount of 15% to 20% by volume of the milk, and calcium chloride and rennet in amounts not substantially in excess of 1.5 oz. and .1 oz., respectively, per 1000 lbs. of milk.

25. The process according to claim 22, in which the mix is set at a temperature of at least 86° F. and is heated to a temperature of at least about 100° F. near the end of the setting period and prior to the centrifuging.

26. In the production of cheese from milk of low fat content by forming a cheese mix including the milk and a starter, and setting the mix to coagulate the curds and form an acid mixture of curds as a heavier component and whey as a lighter component, the starter acting to promote a decrease in the pH value and an increase in the titratable acidity of the mix during the setting thereof, the improvement which comprises centrifuging the mix at a temperature in excess of 80° F. after its titratable acidity has reached about .68% and its pH value has decreased to about 4.8 but while the curds are at approximately the maximum compressibility attained after said last acidity has been reached, thereby effecting a rapid separation of curds from whey, and separately discharging the curds and whey from the centrifuging operation.

27. The improvement according to claim 26, comprising also homogenizing the separated curds to reduce the particle size thereof.

28. The improvement according to claim 26, comprising also adding milk solids to the separated curds to increase the percentage of solids therein.

29. The improvement according to claim 26, comprising also adding milk solids to the separated curds to increase the percentage of solids therein, and homogenizing the mixture of curds and milk solids.

30. The improvement according to claim 26, comprising also cooling the curds to storage temperature promptly after separation thereof.

31. The improvement according to claim 26, comprising also blending the separated curds with fat and heating them to approximately pasteurizing temperature.

32. The improvement according to claim 26, comprising also blending fat with the separated curds discharging from the centrifuging operation.

33. The improvement according to claim 26, in which the separated curds are discharged from the outer portion of the locus of centrifugal force of the centrifuging operation by way of two restricted passages serially connected by an enlarged space, whereby the curds are discharged with a two-stage reduction in pressure.

34. The improvement according to claim 26, in which the curds are discharged from the centrifuging operation with a two-stage reduction in pressure thereon, whereby the curds are homogenized incident to their discharge.

35. The improvement according to claim 26, in which the curds are discharged from the centrifuging operation with a two-stage reduction in pressure thereon, whereby the curds are homogenized incident to their discharge, the improvement comprising also the step of introducing fat into the curds intermediate said two stages of pressure reduction.

36. The improvement according to claim 26, comprising also the steps of precipitating albumins in the separated whey, separating the precipitated albumins from the whey, and mixing the separated albumins with a further quantity of said milk to form another cheese mix for subsequent setting and separation.

References Cited in the file of this patent

UNITED STATES PATENTS

| | | |
|---|---|---|
| 1,868,422 | Luecke | July 19, 1932 |
| 2,224,720 | Butterworth et al. | Dec. 10, 1940 |
| 2,387,276 | Link | Oct. 23, 1945 |
| 2,415,239 | Flowers et al. | Feb. 4, 1947 |
| 2,574,508 | Strezynski | Nov. 13, 1951 |